United States Patent Office 3,366,619
Patented Jan. 30, 1968

3,366,619
DISAZO PYRAZOLONE PIGMENTS
John J. De Lucia, New Milford, N.J., and Joseph W. Dehn, Jr., Great Neck, and Roy A. Pizzarello, Mount Vernon, N.Y., assignors to Interchemical Corporation, New York, N.Y., a corporation of Ohio
No Drawing. Filed Apr. 9, 1965, Ser. No. 447,048
4 Claims. (Cl. 260—161)

ABSTRACT OF THE DISCLOSURE

Pigments were made by coupling tetrazotized 4,4'-diamino - 3,3' - dichlorophenyl with 1 - (3',4' - dimethyl) phenyl - 3 - methyl - 5 - pyrazolone, with 1 - (3',4' - dimethoxy) - phenyl - 3 - methyl - 5 - pyrazolone, and with 1-(4'-phenyl)-phenyl-3-methyl-5-pyrazolone to form three pigments having a lightfastness of at least 100 hours in cellulose acetate film at a concentration of 1% by weight of pigment based on the weight of the film.

This invention relates to pigments consisting of the reaction products of tetrazotized 3,3'-dichlorobenzidine coupled separately to 1-(3',4'-dimethoxy)-phenyl-3-methyl - 5 - pyrazolone, 1 - (3',4' - dimethyl)phenyl - 3 - methyl - 5 - pyrazolone, and 1 - (4' - phenyl) - phenyl - 3-methyl-5-pyrazolone.

The novel pigments of this invention were compared with 45 other pigments prepared from other tetrazotized pyrazolones related in structure as to lightfastness in cellulose acetate films.

The pigments were prepared by first making the appropriate substituted phenyl hydrazine. This was accomplished by diazotizing the corresponding substituted aryl amine, forming the salt, and then reducing the aryl diazonium salt with stannous chloride in hydrochloric acid. The resulting aryl hydrazine salt was isolated and converted by alkali to the aryl hydrazine, which was isolated and purified. An alternative way of obtaining the aryl hydrazine is reaction of the diazotized amine with sodium sulfite, yielding the aryl diazonium sulfonate salt. Subsequent reduction with zinc dust and acetic acid gives the aryl hydrazine beta-sulfonic acid salt. Desulfonation with hydrochloric acid in refluxing ethyl alcohol forms the hydrochloride salt of the aryl hydrazine. Some of the substituted aryl amines were not commercially available and therefore had to be prepared. The 4-amino diphenyl ether was made by reduction of 4-nitro diphenyl ether using zinc dust in a refluxing solution containing water, calcium chloride, and ethyl alcohol. The Gomberg reaction of diazotized m-nitroaniline with benzene in the presence of sodium acetate gave 3-nitrobiphenyl, which on hydrogenation in ethyl alcohol in the presence of a palladium catalyst using carbon as a carrier yielded 3-amino-biphenyl.

Some of the aryl hydrazines, particularly those containing methoxy groups were unstable and readily oxidized by air. The impure compounds were considerably less stable than those that had been purified. The purified hydrochloride salts were more stable to air oxidation than the free bases. The methoxy-substituted phenyl hydrazines and some of the others were therefore handled under an atmosphere of nitrogen and were used in further synthesis very soon after their preparation.

The pyrazolones were made by reacting the appropriate substituted aryl hydrazine with acetoacetic acid ethyl ester to produce the corresponding hydrazone. The substituted 1-aryl-3-methyl-5-pyrazolone was synthesized by ring closure of the hydrazone with concurrent elimination of ethyl alcohol. Formation of the hydrazones was catalyzed by a weakly acidic medium, and they often formed readily even in the absence of weak acid. The simplest method of pyrazolone formation was based on a thermally induced ring closure. The aryl hydrazine and acetoacetic acid ethyl ester were reacted to form the hydrazone, which was then heated sufficiently to effect ring closure, the progress of the reaction being followed by collecting the ethyl alcohol formed in a graduated Dean-Stark trap. The hydrazone can also be formed by reaction in a weakly acidic medium. The isolated hydrazone can then be cyclized to the pyrazolone by the action of hot aqueous alkali, followed by acidification to precipitate the product.

In several instances acetoacetic acid ethyl ester was reacted with an aryl hydrazine in ethyl alcohol containing acetic acid, the latter catalyzing hydrazone formation. The solution was stirred at reflux for some hours to form the pyrazolone.

Substituted 1 - phenyl - 5 - pyrazolone - 3 - carboxylic acid ethyl esters were prepared by reacting an aqueous or alcoholic solution of the aryl hydrazine hydrochloride with sodium diethyl oxalacetate to give the corresponding hydrazone, which was isolated after the reaction mixture had been stirred overnight. The reaction was carried out in aqueous medium for the derivatives 3'-methyl-; 4'-methyl-; 3',4'-dimethyl-; 3'-methoxy-; 4'-methoxy-; 2'-chloro-; 2'-nitro-; 3'-nitro-; and 4'-nitro-. A catalytic amount of acetic acid was added in preparing hydrazones of the 2'-nitro- and 4'-nitro- derivatives. The 3'-chloro-, 2'-phenyl-, and 4'-phenyl-derivatives of the hydrazone intermediates were prepared using ethyl alcohol as solvent instead of water and in the presence of a catalytic amount of acetic acid in the case of the 3'-chloro-compound.

The ring closure was carried out in alkaline medium which was aqueous alkali in the case of the 3'-methyl-; 4'-methyl-; 3',4'-dimethyl-; 3'-methoxy-; 4'-methoxy-; and 3'-nitro-derivatives. Sodium carbonate was added slowly to an aqueous suspension of the hydrazone, which gradually formed a sodium salt of the pyrazolone. After it was stirred overnight, the solution was treated with activated carbon, filtered, and the pyrazolone precipitated by the addition of hydrochloric acid. The 2'-chloro-, 3'-chloro-, 2'-nitro-, 4'-nitro-, 2'-phenyl-, and 4'-phenyl-compounds were ring closed to the pyrazolone using sodium hydroxide in ethyl alcohol solution.

The substituted 1-phenyl-5-pyrazolone-3-carboxylic acid amide compounds were synthesized by ammonolysis of the corresponding 3-carboxylic acid ethyl ester using aqueous ammonia under pressure in a stirred autoclave. The amino-substituted compounds were obtained by reduction of the corresponding nitro compounds.

3,3'-dichlorobenzidine, in the form of its dihyrochloride, was diazotized (tetrazotized) by stirring 0.05 mole (20.2 g. of 62.5% solids content) overnight in 265 ml. of 0.7 molar hydrochloric acid solution. The suspension was then cooled to 0° C. and diazotized (tetrazotized) in the usual way with 7.2 g. of sodium nitrate in 40 ml. water. The solution was treated with 1.0 g. of activated charcoal and 1.0 g. of "Filtercel" (diatomaceous earth) and filtered after 15 minutes. The diazo compound was immediately used in the coupling reaction.

0.05 mole of o-dianisidine was diazotized (tetrazotized) by stirring 30 minutes in 185 ml. of 1.4 molar hydrochloric acid solution at room temperature. The suspension was then diazotized (tetrazotized) in the usual way with 7.2 g. of sodium nitrite in 40 ml. of water. 1.0 g. of activated charcoal and 1.0 g. of "Filtercel" were stirred in the suspension for 15 minutes before filtering. The compound was used immediately after preparation.

The general procedure for coupling the diazotized (tetrazotized) compounds with pyrazolones was carried out by dissolving 0.02 mole of the pyrazolone in about 60 ml.

of 0.4 molar sodium hydroxide solution. Ice was added to bring the volume up to about 200–250 ml. and the pyrazolone precipitated by adding 32 ml. of a 5% aqueous solution of acetic acid or an equivalent amount of HCl dropwise over a period of 30 minutes followed by addition of 9.7 g. of sodium acetate. 0.01 mole of the diazotized (tetrazotized) component was added dropwise to the stirred batch of pyrazolone at 0–5° C. The suspension was then stirred 1 hour and the pigment filtered, washed, and dried at 45° C. or stored as a pulp without drying. It was generally found to be desirable to add about 250 to 300 cc. of absolute alcohol to the reaction the mixture to aid in completing coupling reaction.

The following examples describe in detail how the specific pigments of this invention were made.

EXAMPLE 1

(A) *3,4-dimethoxyphenyl hydrazine hydrochloride.*—A solution of 30.0 g. (0.196 mole) of 3,4-dimethoxyaniline (4-amino veratrole), 150 ml. of concentrated hydrochloric acid, and 160 ml. of water was cooled in a salt-ice bath to precipitate the hydrochloride. This was diazotized by adding over a period of 20 minutes a solution of 14.0 g. (0.203 mole) of sodium nitrite in 140 ml. of water and stirring 25 minutes longer. The diazo solution was reduced by adding in 25 minutes at −14° to −11° C. a solution containing 112 g. (0.497 mole) of stannous chloride dihydrate in 90 ml. of concentrated hydrochloric acid. A yellow precipitate formed. The batch was stirred 1½ hours at −15° to −11° C. It was then allowed to attain room temperature, whereupon the precipitate dissolved. The solution was cooled to −10° C. The crystals that formed were filtered and sucked dry. The filter cake was recrystallized from 280 ml. of 95% ethanol. These crystals had a melting point of 157°–159° C. (decomposition).

(B) *1-(3′,4′-dimethoxy)-phenyl-3 - methyl-5 - pyrazolone.*—A mixture of 24.5 g. (0.12 mole) of 3,4-dimethoxyphenylhydrazine hydrochloride, 15.6 g. (0.12 mole) of acetoacetic acid ethyl ester 10.0 g. (0.122 mole) of sodium acetate and 150 ml. of absolute ethanol was heated 13 hours at reflux temperature (81° C.) The residue of sodium chloride was filtered off and washed with 50 ml. of ethanol. The filtrate was cooled to 5° C. and the resulting precipitate filtered, washed with 25 ml. of ice cold ethanol, and oven dried at 50° C. The solid had a M.P. of 155°–157° C. A second crop of crystals was recovered by evaporating most of the solvent from the filtrate.

EXAMPLE 2

(A) *3,4-dimethylphenyl hydrazine.*—49.7 g. (0.410 mole) of 3,4-dimethylaniline were dissolved in 400 ml. concentrated hydrochloric acid by heating at 55° C. When the solution was cooled the amine salt precipitated. 200 ml. of water were added and cooling continued to 0° C. The amine was diazotized with 29.0 g. (0.42 mole) of sodium nitrite in 120 ml. of water. The diazotized solution was reduced with a solution of 280 g. (1.24 mole) of stannous chloride dihydrate in 225 ml. of concentrated hydrochloric acid. The hydrazine salt was filtered and the cake treated with potassium hydroxide solution to form the hydrazine, which was then washed with water until the wash water was neutral to phenolphthalein. The filter cake was dissolved in 350 ml. of warm ethyl ether, the water layer discarded, and the ether layer dried over anhydrous sodium sulfate. The crystals obtained from the ether solution had a M.P. of 49.5°–52.0° C.

(B) *1-(3′,4′-dimethyl)-phenyl-3-methyl-5-pyrazolone.*—30.0 g. (0.220 mole) of 3,4-dimethyl-phenylhydrazine were added in 40 minutes to 28.6 g. (0.220 mole) of acetoacetic acid ethyl ester. The exothermic reaction gradually raised the temperature to 52° C., whereupon the mass solidified due to the formation of the hydrazone. The mass was heated at 74° C. on a steam bath for about 1½ hours, until no more distillate was collected by a Dean-Stark trap. The batch was dissolved in 65 ml. of benzene, cooled and precipitated with 20 ml. of petroleum ether. The precipitate was filtered, washed with petroleum ether, and dried. The melting point was 112.5°–114.5° C. This pyrazolone (0.163 mole, 33.0 g.) was dissolved in a solution of 6.5 g. (0.163 mole) of sodium hydroxide in 645 ml. of water, decolorized with charcoal, and filtered. 163 ml. of 1 molar hydrochloric acid were added dropwise to the filtrate. The resulting white precipitate was filtered, washed, and dried at 50° C. The product melted at 115°–117.5° C. 28.8 g. recrystallized from a mixture of 115 ml. of benzene and 220 ml. of petroleum ether gave 23.6 g. of a light tan powder having a melting point of 116°–118° C.

EXAMPLE 3

(A) *4-phenyl phenylhydrazine.*—84.6 g. (0.500 mole) of p-aminodiphenyl were refluxed with 350 ml. of concentrated hydrochloric acid and 800 cc. of water. The suspension was cooled and diazotized with 35.0 g. (0.507 mole) of sodium nitrite in 145 ml. of water at 0° C. and the diazotized material was reduced with a solution of 400 g. (1.77 moles) of stannous chloride dihydrate in 335 ml. of concentrated hydrochloric acid. The resulting hydrazine salt was isolated and treated with 800 ml. of 25% potassium hydroxide solution at a temperature below 20° C. The cake of hydrazine recovered was dissolved in 2 liters of boiling benzene and the solution freed of water by separation and distillation. 4 liters of petroleum ether were added to the cooled benzene solution and the resulting precipitate was filtered, air dried, and stored in the refrigerator. The M.P. was 127°–128° C.

(B) *1-(4′-phenyl)-phenyl-3 - methyl - 5 - pyrazolone.*—42.0 g. (0.228 mole) of p-phenyl phenylhydrazine was added over a period of 35 minutes to 29.6 g. (0.228 mole) of acetoacetic acid ethyl ester. The mixture was heated 3 hours on the steam bath while 12.4 ml. of distillate were collected in the attached Dean-Stark trap. The now solid batch was dissolved in 1400 ml. of boiling benzene and the solution concentrated to about 150 ml., cooled, filtered, and the precipitate was dried. The solid had a M.P. of 199.5°–202° C. This crude product was dissolved in a solution of 6.4 g. (0.16 mole) of sodium hydroxide in 635 ml. water at 40° C. The solution was filtered and a solution of 13.0 ml. (0.16 mole) of concentrated hydrochloric acid in 150 ml. of water was then added dropwise. The filtered, washed, and dried precipitate had a melting point of 196.5°–199° C. On recrystallization from benzene after clarifying with activated charcoal the material showed a melting point of 203°–204° C.

Examples of the coupling procedures (W) 17.12 g. of a pulp containing 59.1% dichlorobenzidine (0.04 M) in a solution of 11.6 cc. concentrated HCl in 200 cc. water was stirred overnight and then cooled (externally) with ice to 5° C. 16 g. ice were added to the solution, which was then, at 0° C., poured quickly into a solution of 6.4 g. NaNO₂ in 32 cc. water. The batch was stirred one hour. 1 g. "Darco" (activated charcoal) and 1 g. "Filtercel" (diatomaceous earth) were added. The mixture was filtered.

(X) To 8.96 g. (0.04 M) of 1-(3′,4′-dimethoxy)-phenyl-3-methyl-5-pyrazolone in 100 cc. water were added 4.4 cc. of 10 M sodium hydroxide and the batch stirred until the solids were dissolved. Enough ice was added to bring the volume up to 400 cc. The pyrazolone was then precipitated with 4.4 cc. of 10 M hydrochloric acid in 26 cc. of water, added over a 20-minute period. 11.2 g. of sodium acetate were added and the batch was stirred 10 minutes. 0.02 M of the diazotized product described above, under (W), was added dropwise to the pyrazolone charge, prepared as above, at 0 to 5° C. with constant stirring. The batch slightly acid to Congo Red was stirred 2 hours, filtered, and washed acid free.

The pigment thus prepared is the subject of claim 3.

(Y) The procedure described above under (X) was repeated, but using as pyrazolone 8.9 g. (0.04 M) of 1-(3', 4'-dimethyl)-phenyl-3-methyl-5-pyrazolone.

The product is the subject of claim 4.

(Z) The procedure of (X) was repeated, but the pyrazolone used was 1-(4'-phenyl)-phenyl-3-methyl-5-pyrazolone.

The product is the subject of claim 2.

In all three coupling procedures, (X), (Y), and (Z), it was found desirable to add 500–600 cc. of absolute ethanol to hasten completion of the reaction.

The pigments were evaluated for lightfastness by dispersing them in cellulose acetate film and subjecting them to standard tests for lightfastness by dispersing them in cellulose acetate film and subjecting them to standard tests for lightfastness in the "Fade-Ometer."

The dispersions were made by grinding a mixture of 0.500 g. pigment, 10 g. dimethyl phthalate, and 40 g. cellulose acetate in a 2-roll mill at 250° F. for 8 passes, cooling, and breaking the mass up into chips. "1%" film was made by mixing 20 g. of the chips with 80 g. acetone, shaking in a paint shaker for 4 intervals of 15 minutes each, and casting a film from the solution. The film when free of solvent, contained 1% of pigment by weight. "¼%" film was made by mixing 5 g. of the chips, 3 g. of dimethyl phthalate, 12 g. of cellulose acetate, and 80 g. of acetone and processing the mixture in the same way as in the process for making "1%" film.

The lightfastness in hours of the various pigments is shown in the table following.

The structure of the pigments may be represented by the formula below and the variation in substituents on A is indicated in the table under X, R, 2, 3, 4, 5.

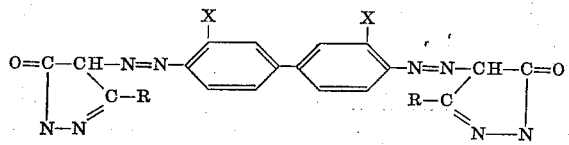

| | Substituents | | | | | Lightfastness in Cellulose Acetate Film | |
|---|---|---|---|---|---|---|---|
| R | 2 | 3 | 4 | 5 | X | ¼% | 1% |
| CH₃ | CH₃ | | | | Cl | 40 | +100 |
| CH₃ | CH₃ | | | | Cl | 20 | 20 |
| CH₃ | CH₃ | | | | OCH₃ | 20 | 20 |
| CH₃ | CH₃ | | CH₃ | | Cl | 60 | 100 |
| CH₃ | OCH₃ | | | | Cl | 20 | 20 |
| CH₃ | OCH₃ | | | | OCH₃ | 20 | 20 |
| CH₃ | | | OCH₃ | | Cl | 100 | 100 |
| CH₃ | | | OCH₃ | | OCH₃ | 20 | 40 |
| CH₃ | | | OC₆H₅ | | Cl | 60 | 60 |
| CH₃ | | | OC₆H₅ | | OCH₃ | 60 | 60 |
| CH₃ | | NH₂ | | | Cl | 20 | 20 |
| CH₃ | | NH₂ | | | OCH₃ | 20 | 20 |
| CH₃ | | | NH₂ | | Cl | 20 | 60 |
| CH₃ | | | NH₂ | | OCH₃ | 20 | 20 |
| CH₃ | | C₆H₅ | | | Cl | 20 | 20 |
| CH₃ | | C₆H₅ | | | OCH₃ | 20 | 20 |
| CH₃ | | | C₆H₅ | | Cl | 80 | 100 |
| CH₃ | | | C₆H₅ | | OCH₃ | 20 | 20 |
| CH₃ | Cl | | | | Cl | 20 | 20 |
| CH₃ | Cl | | | | OCH₃ | 20 | 20 |
| CH₃ | | Cl | | | Cl | 20 | 20 |
| CH₃ | | Cl | | | OCH₃ | 20 | 20 |
| CH₃ | | | Cl | | Cl | 20 | 20 |
| CH₃ | | | Cl | | OCH₃ | 20 | 20 |
| CH₃ | | | NO₂ | | Cl | 40 | 60 |
| CH₃ | | | NO₂ | | OCH₃ | 20 | 40 |
| CH₃ | β-Naphthyl | | | | Cl | 60 | 60 |
| CH₃ | β-Naphthyl | | | | OCH₃ | 20 | 20 |
| CH₃ | β-Naphthyl | | | | Cl | 40 | 100 |
| CH₃ | β-Naphthyl | | | | OCH₃ | 20 | 40 |
| C₆H₅ | | | | | Cl | 40 | 100 |
| C₆H₅ | | | | | OCH₃ | 20 | 20 |
| CH₃ | | CH₃ | CH₃ | | Cl | 100 | 100 |
| CH₃ | | CH₃ | CH₃ | | OCH₃ | 20 | 40 |
| CH₃ | | OCH₃ | OCH₃ | | Cl | 100 | 200 |
| CH₃ | | OCH₃ | OCH₃ | | OCH₃ | 40 | 100 |
| CH₃ | OCH₃ | | | CH₃ | Cl | 40 | 80 |
| CH₃ | OCH₃ | | | CH₃ | OCH₃ | 20 | 20 |
| CH₃ | | OCH₃ | CH₃ | | Cl | 40 | 100 |
| CH₃ | | OCH₃ | CH₃ | | OCH₃ | 20 | 20 |
| CH₃ | Cl | | | Cl | Cl | 20 | 20 |
| CH₃ | Cl | | | Cl | OCH₃ | 20 | 20 |
| CH₃ | | Cl | Cl | | Cl | 20 | 20 |
| CH₃ | | Cl | Cl | | OCH₃ | 20 | 20 |
| COOC₂H₅ | | | | | Cl | 20 | 20 |
| COOC₂H₅ | | | | | OCH₃ | 20 | 40 |
| COOC₂H₅ | | CH₃ | | | Cl | 20 | 20 |
| COOC₂H₅ | | CH₃ | | | OCH₃ | 20 | 20 |
| COOC₂H₅ | | | CH₃ | | Cl | 20 | 20 |
| COOC₂H₅ | | | CH₃ | | OCH₃ | 20 | 20 |
| COOC₂H₅ | | | OCH₃ | | Cl | 40 | 40 |
| COOC₂H₅ | | | OCH₃ | | OCH₃ | 20 | 100 |
| COOC₂H₅ | NH₂ | | | | Cl | 20 | 20 |
| COOC₂H₅ | NH₂ | | | | OCH₃ | 20 | 20 |
| COOC₂H₅ | C₆H₅ | | | | Cl | 20 | 20 |
| COOC₂H₅ | C₆H₅ | | | | OCH₃ | 20 | 20 |
| COOC₂H₅ | | | C₆H₅ | | Cl | 20 | 20 |
| COOC₂H₅ | | | C₆H₅ | | OCH₃ | 20 | 20 |
| COOC₂H₅ | NO₂ | | | | Cl | 20 | 20 |
| COOC₂H₅ | NO₂ | | | | OCH₃ | 20 | 20 |
| COOC₂H₅ | | NO₂ | | | Cl | 20 | 20 |
| COOC₂H₅ | | NO₂ | | | OCH₃ | 20 | 40 |
| COOC₂H₅ | | | NO₂ | | Cl | 20 | 20 |
| COOC₂H₅ | | | NO₂ | | OCH₃ | 20 | 20 |
| COOC₂H₅ | Cl | | | | Cl | 20 | 20 |
| COOC₂H₅ | Cl | | | | OCH₃ | 20 | 20 |
| COOC₂H₅ | | Cl | | | Cl | 20 | 20 |
| COOC₂H₅ | | Cl | | | OCH₃ | 20 | 40 |
| COOC₂H₅ | | CH₃ | CH₃ | | Cl | 20 | 40 |
| COOC₂H₅ | | CH₃ | CH₃ | | OCH₃ | 20 | 20 |
| CONH₂ | | | | | Cl | 20 | 20 |
| CONH₂ | | | | | OCH₃ | 20 | 20 |

| Substituents | | | | | | Lightfastness in Cellulose Acetate Film | |
|---|---|---|---|---|---|---|---|
| R | 2 | 3 | 4 | 5 | X | 1/4% | 1% |
| CONH₂ | | CH₃ | | | Cl | 20 | 20 |
| CONH₂ | | CH₃ | | | OCH₃ | 20 | 20 |
| CONH₂ | | CH₃ | CH₃ | | Cl | 20 | 20 |
| CONH₂ | | CH₃ | CH₃ | | OCH₃ | 20 | 20 |
| CONH₂ | | OCH₃ | | | Cl | 20 | 20 |
| CONH₂ | | OCH₃ | | | OCH₃ | 20 | 20 |
| CONH₂ | | | OCH₃ | | Cl | 40 | 40 |
| CONH₂ | | | OCH₃ | | OCH₃ | 20 | 20 |
| CONH₂ | | | NH₂ | | Cl | 20 | 20 |
| CONH₂ | | | NH₂ | | OCH₃ | 20 | 100 |
| CONH₂ | | | C₆H₅ | | Cl | 20 | 20 |
| CONH₂ | | | C₆H₅ | | OCH₃ | 20 | 20 |
| CONH₂ | NO₂ | | | | Cl | 40 | 40 |
| CONH₂ | NO₂ | | | | OCH₃ | 40 | 20 |
| CONH₂ | Cl | | | | Cl | 40 | 40 |
| CONH₂ | Cl | | | | OCH₃ | 20 | 20 |
| CONH₂ | | CH₃ | CH₃ | | Cl | 20 | 20 |
| CONH₂ | | CH₃ | CH₃ | | OCH₃ | 20 | 20 |

What is claimed is:

1. A pigment consisting essentially of the compound represented by the formula

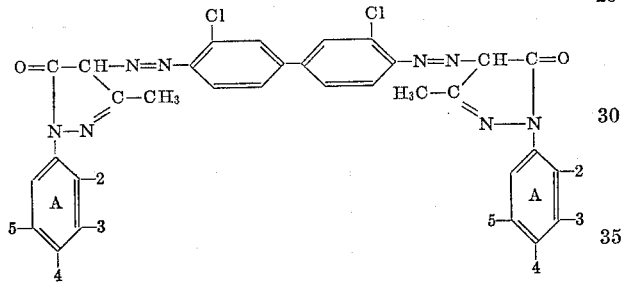

wherein the substituents on A are selected from the group consisting of (a) phenyl groups in the 4 positions, (b) methoxy groups in the 3 and the 4 positions, and (c) methyl groups in the 3 and the 4 positions.

2. A pigment according to claim 1 having phenyl substituents in the 4 positions.

3. A pigment according to claim 1 having methoxy substituents in the 3 and the 4 positions.

4. A pigment according to claim 1 having methyl substituents in the 3 and the 4 positions.

References Cited

UNITED STATES PATENTS 2,031,426  2/1936  Niemann _____ 260—161
3,120,508  2/1964  Braun et al. _____ 260—161

FOREIGN PATENTS 835,618  7/1957  Great Britain.

FLOYD D. HIGEL, *Primary Examiner*.

UNITED STATES PATENT OFFICE
CERTIFICATE OF CORRECTION

Patent No. 3,366,619  January 30, 1968

John J. De Lucia et al.

It is hereby certified that error appears in the above numbered patent requiring correction and that the said Letters Patent should read as corrected below.

Column 6, lines 15 to 20, the formula should appear as shown below instead of as in the patent:

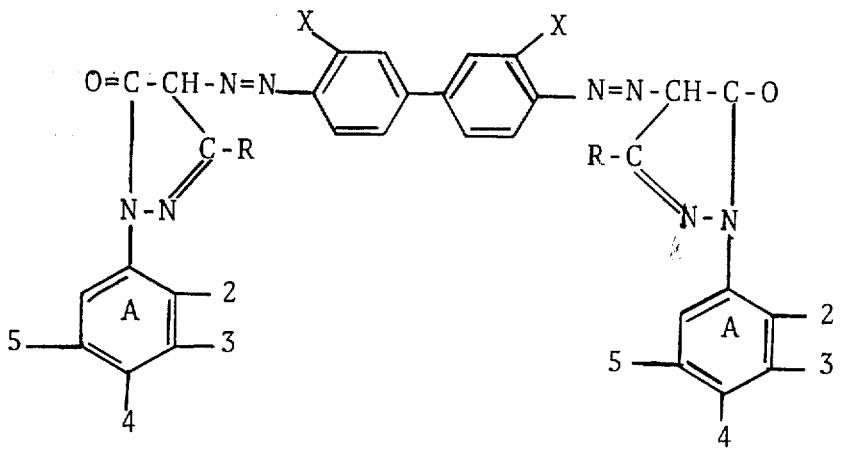

Signed and sealed this 24th day of June 1969.

(SEAL)
Attest:

EDWARD M. FLETCHER, JR.
Attesting Officer

WILLIAM E. SCHUYLER, JR.
Commissioner of Patents